United States Patent

Brechtel et al.

Patent Number: 5,802,527
Date of Patent: Sep. 1, 1998

[54] DATA ENHANCEMENT ENGINE

[75] Inventors: James P. Brechtel, Florissant; John Rivera, Colorado Springs, both of Colo.

[73] Assignee: MCI Communications Corporation, Washington, D.C.

[21] Appl. No.: 775,798

[22] Filed: Dec. 31, 1996

[51] Int. Cl.$^6$ ................................................ G06F 17/30
[52] U.S. Cl. .................. 707/200; 707/103; 395/200.48; 395/200.33
[58] Field of Search ................................ 379/112, 113; 380/385; 395/200.33, 200.48; 707/10, 4, 201

[56] References Cited

U.S. PATENT DOCUMENTS

| | | | |
|---|---|---|---|
| 5,434,852 | 7/1995 | La Porta et al. | 370/385 |
| 5,606,600 | 2/1997 | Elliott et al. | 379/112 |
| 5,606,601 | 2/1997 | Witzman et al. | 379/113 |
| 5,619,710 | 4/1997 | Travis, Jr. et al. | 395/200.33 |
| 5,687,223 | 11/1997 | Elliott et al. | 379/113 |

OTHER PUBLICATIONS

Stanley M. Sutton, Jr and Leon J. Osterweil, PDP: Programming a Programmable design Process, IEEE 1996, Proceedings of IWSSD-8. and 186–190.

*Primary Examiner*—Thomas G. Black
*Assistant Examiner*—Srirama Channavajjala

[57] ABSTRACT

A Data Enhancement Engine uses a novel object-oriented architecture to provide real-time data enhancement on event records. The architecture is highly scalable so that new data enhancement processes are added quickly and easily, allowing client system requirements to be met in minimal time. In the preferred embodiment, the Data Enhancement Engine is employed in a Network Information Concentrator for a telecommunications network. It receives a real-time feed of event records from a network information distributor process and activates specific enhancement processes based on filtering criteria. These enhancement processes are realized with derivable object classes. They will retrieve appropriate data from an object database and enhance the record with that data. The Data Enhancement Engine will then format the enhanced record according to a specific client's requirements, and send the record to the client. There is a distinct record receiving and filtering process defined for each client system. There are also distinct enhancement processes defined for each type of record enhancement that a client requires. If new enhancement types are required, then new enhancement processes may be created by simply deriving from a base class a new set of classes. This new set of classes may then be defined with the specific methods needed for the enhancement types they support.

5 Claims, 8 Drawing Sheets

DATA ENHANCEMENT ENGINE

RELATED APPLICATIONS

The present application relates to U.S. patent application Ser. No. 08/720,479, filed Sep. 30, 1996, entitled "Common Channels For Inter-Application Communications" and U.S. patent application Ser. No. 08/426,256, filed Apr. 21, 1995, entitled "Network Information Concentrator".

FIELD OF THE INVENTION

The present invention relates to telecommunication networks data processing, and, more particularly, to the enhancement of data in event records.

BACKGROUND OF THE INVENTION

Businesses that offer transaction-based services must employ sophisticated data processing systems to process event records. Data processing generally entails data enhancement of event records in order to meet the requirements of various clients. As an example, a telecommunications service provider creates call records on its network. These call records are processed and enhanced on a server system to meet the needs of various client systems. Examples of client systems that require enhanced call records are billing, reporting, traffic statistics, network management, and network provisioning.

As client systems are added and modified, their data enhancement requirements are added and modified as well. Thus, there is a need to augment and modify the data enhancement processes of the server system. Because client systems may be added or modified in a short timeframe, augmentation and modification of data enhancement processes must be performed quickly and efficiently.

Previously, augmentation and modification of data enhancement processes in a server system required effort-intensive and time-consuming reprogramming of fundamental levels of source code. There is a need for a data enhancement system that is scalable and modular so as to allow quick and efficient augmentation/modification of data enhancement processes.

BRIEF DESCRIPTION OF THE PRESENT INVENTION

A Data Enhancement Engine uses a novel object-oriented architecture to provide real-time data enhancement on event records. The architecture is highly scalable so that new data enhancement processes are added quickly and easily, allowing client system requirements to be met in minimal time.

In the preferred embodiment, the Data Enhancement Engine is employed in a Network Information Concentrator (NIC) for a telecommunications network. A NIC is described in co-pending U.S. patent application Ser. No. 08/426,256, titled "Network Information Concentrator", filed on Apr. 21, 1995. The engine receives a real-time feed of event records from a network information distributor process and activates specific enhancement processes based on filtering criteria. These enhancement processes are realized with derivable object classes. They will retrieve appropriate data from an object database and enhance the record with that data.

The Data Enhancement Engine will then format the enhanced record according to a specific client's requirements, and send the enhanced record to the client.

There is a distinct record receiving and filtering process defined for each client system. There are also distinct enhancement processes defined for each type of record enhancement that a client requires. If new enhancement types are required, then new enhancement processes may be created by simply deriving from a base class a new set of classes. This new set of classes may then be defined with the specific methods needed for the enhancement types they support.

The present invention may be used in a variety of data enhancement systems employed by businesses in many industries. The preferred embodiment provides a data enhancement engine for a Network Information Concentrator (NIC) employed by a telecommunications service provider.

A NIC collects event records from a telecommunications network, performs various data enhancement and event correlation functions in accordance with client systems' requirements, and then sends the data records to the appropriate client systems. For the remainder of this description, the NIC example is described only for exemplary purposes and not by way of limitation.

BRIEF DESCRIPTION OF THE FIGURES

The above-mentioned objects and advantages of the present invention will be more clearly understood when considered in conjunction with the accompanying drawings, in which.

DETAILED DESCRIPTION OF THE INVENTION

Figure 1:
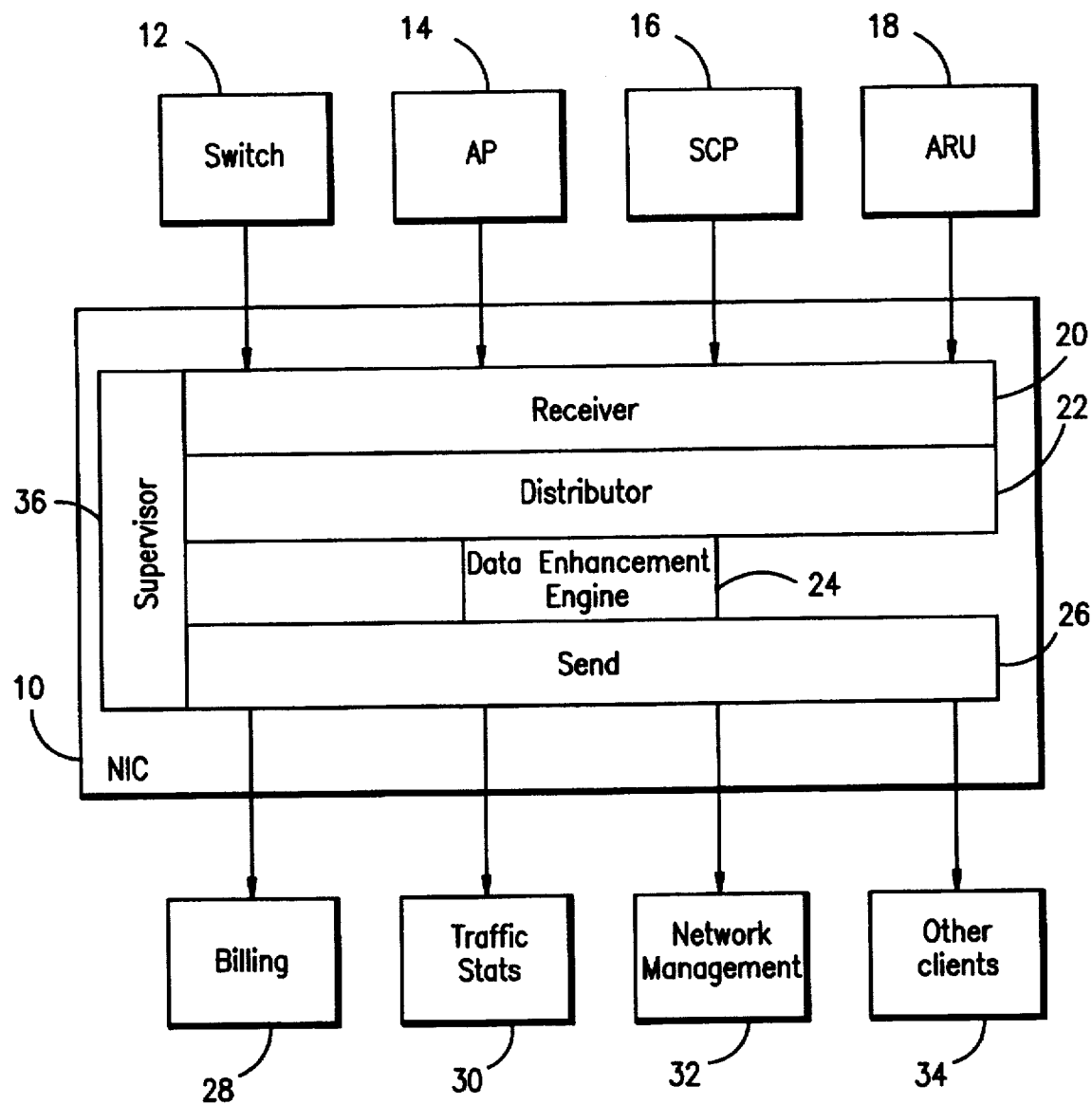
FIG. 1 is a block diagram illustrating the positioning of the present Data Enhancement Engine in the context of an event record collecting platform (NIC).

FIG. 1 is a block diagram showing a Data Enhancement Engine in the context of a NIC. A NIC 10 receives event records, such as call records, from various existing network elements. These elements include, but are not limited to, Switches 12, Adjunct Processors 14, Service Control Points 16, and Audio Response Units 18. A Receiver process 20 in the NIC 10 receives the event records. A Distributor process 22 filters the records based on predefined criteria, duplicates them as necessary for multiple downstream processes, and distributes the records to various downstream processes within the NIC 10. While many such downstream processes may exist, only one is shown: the Data Enhancement Engine 24. The Receiver and Distributor processes are described in the previously mentioned patent application concerning the NIC. The Data Enhancement Engine 24 receives those records that require enhancement, as determined by the Distributor 22. There may actually be multiple Distributor processes 22.

The Data Enhancement Engine 24 performs data enhancement on records it receives, and then passes them on to one or more Send processes 26. The Send process 26 transmits these records to various existing client systems that require them. Examples of client systems are Billing 28, Traffic Statistics 30, and Network Management 32. Many other types of client systems 34 may exist.

A Supervisor process 36 manages the processing throughout the NIC 10. The Send and Supervisor processes are described in the co-pending patent application for the NIC.

The NIC 10 is implemented on a distributed processing platform, and may reside on multiple hardware components.

Figure 2:
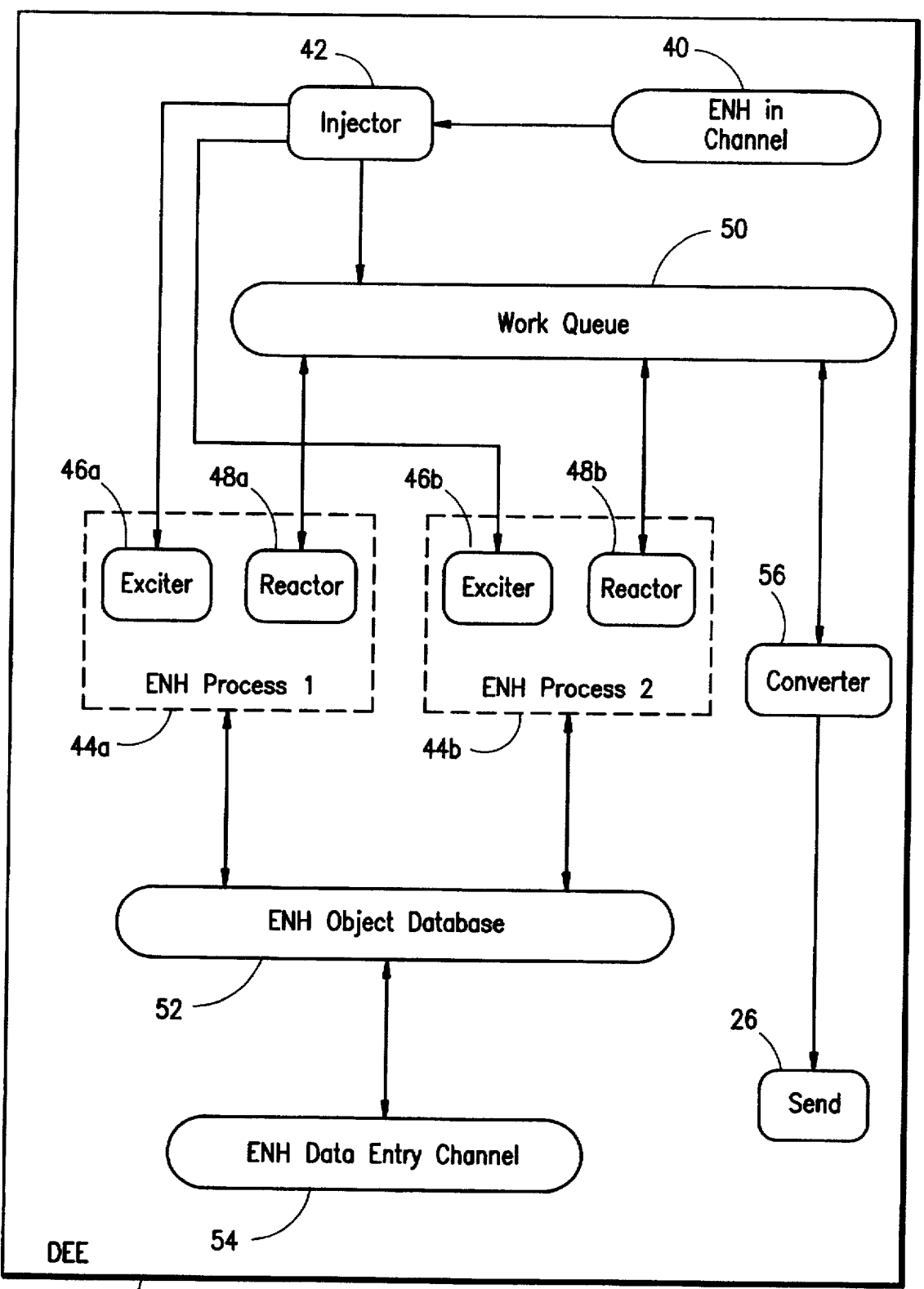
FIG. 2 is a block diagram of the Data Enhancement Engine's preferred architecture.

FIG. 2 is a block diagram of the Data Enhancement Engine's preferred architecture. The Data Enhancement Engine 24 receives unenhanced records from one or more Distributor processes 22 through an Enhanced (ENH) Input Channel 40. The Distributor process 22 will filter records to provide a separate record for each enhancement process and to eliminate records that do not require enhancement.

Because the NIC 10 is implemented on a distributed processing platform, any inter-process communication channels may utilize various methods and protocols. These include shared memory, TCP/IP, SNA (IBM), and others. A preferable method for implementing inter-process communications in this architecture is known as Common Channels, described in the previously identified related co-pending application. As such, the ENH In Channel 40 preferably utilizes the Common Channels to receive unenhanced records from the Distributor process 22 via shared memory.

These records are then processed by an Injector process 42. The Injector process 42, as with all processes in the Data Enhancement Engine 24, is implemented as an object class. There is an Injector class 42 defined for each client system (28, 30, 32, 34). Additionally, there is a data enhancement (ENH) process defined for each enhancement required. Although only two ENH Processes 44a, 44b are shown, in reality there will be many more. These ENH Processes run in parallel. This provides a very scalable architecture that makes the augmentation of enhancement processes for additional client requirements very quick and easy.

Each ENH Process 44a, 44b consists of an Exciter object 46a, 46b and a Reactor object 48a, 48b. The Exciter and Reactor objects are instances of defined Exciter and Reactor classes, respectively. There is a distinctly defined Exciter and Reactor class for each ENH process. The Exciter class and Reactor class for each enhancement type inherit their attributes and methods from the same Exciter and Reactor base classes, respectively. They are then specifically defined for a distinct enhancement type. This is also true for the Injector classes 42 for each client; they inherit from a base Injector class. This simplifies and expedites the effort of developing additional enhancement processes for new or modified clients.

When the Injector 42 receives an unenhanced record, it determines which ENH Process (e.g., 44a) is needed for that record. It then places the record in a WorkQueue 50, and triggers the appropriate Exciter (e.g., 46a). The WorkQueue 50 allocates a region of memory, known as a WorkCell, and places the record there. When the Injector 42 triggers the Exciter 46a, it indicates the WorkCell that contains the record. The Exciter 46a then activates the Reactor 48a and provides the name of the WorkCell (which indicates memory address). The Reactor 48a can then access the WorkCell within the WorkQueue 50, and perform the data enhancement.

The Reactor 48a will perform a query to an ENH Object Database 52 to retrieve the enhancement data. The ENH Object Database 52 contains all the data that is needed for enhancing each type of event record in accordance with client systems' requirements. An ENH Data Entry Channel 54 populates the Database 52 with input from users. The Reactor 48a, when triggered by the Exciter 46a, will retrieve both the unenhanced record from the WorkQueue 50 and the appropriate enhancement data from the ENH Object Database 52. The Reactor will then perform the data enhancements, and place the enhanced record back in the WorkQueue.

Multiple ENH Processes may act on a single record in parallel. Each enhancement type, which has a distinct ENH Process, works on a distinct segment of the record.

A Converter process 56, which is also implemented as a class, retrieves the enhanced records from the WorkQueue 50 and formats them for the client systems that are to receive them. The Converter 56 then passes the formatted enhanced record to one or more Send processes 26, which sends them to the appropriate client systems.

Figure 3:
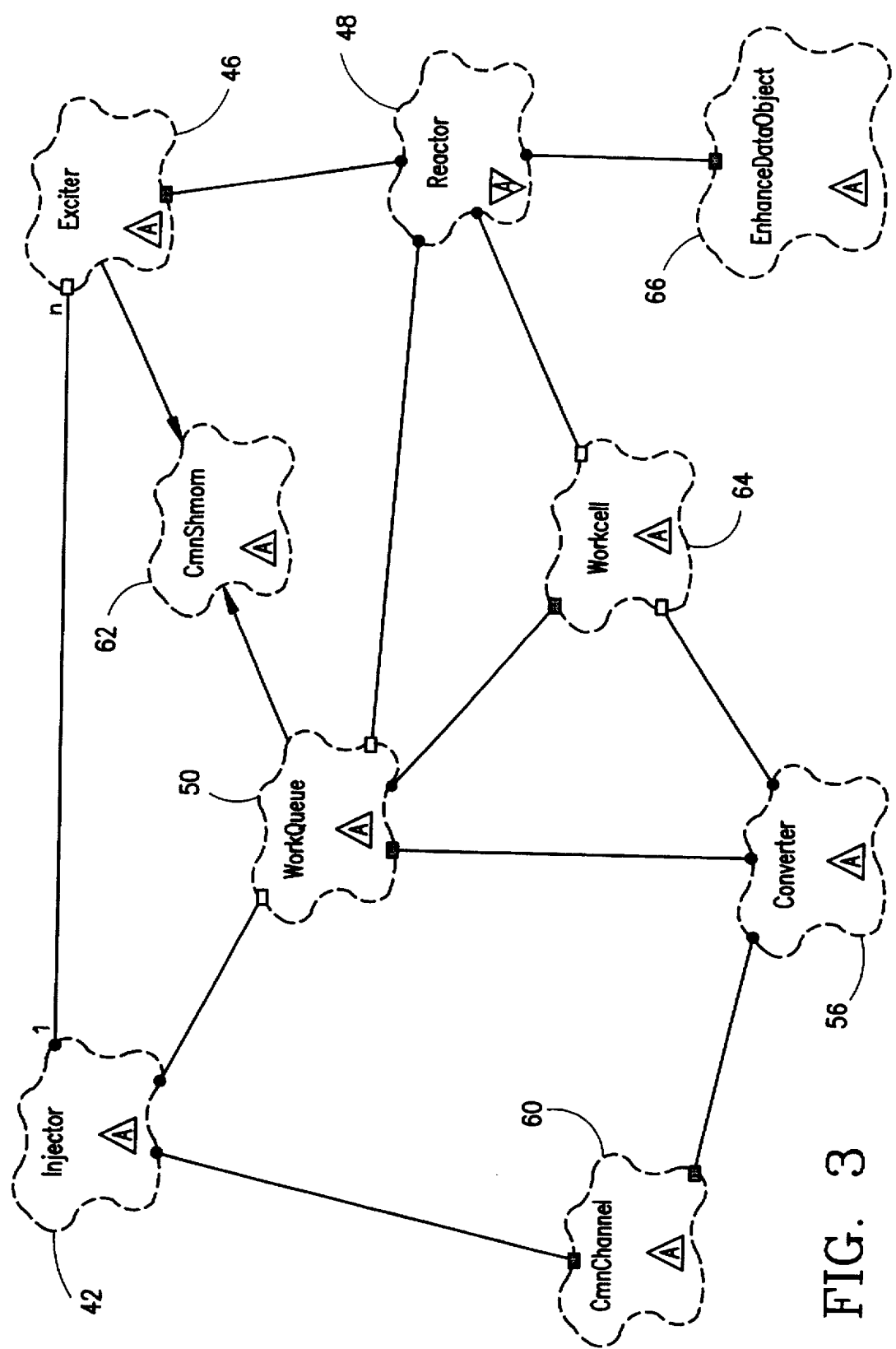
FIG. 3 is an object class diagram, in Booch notation illustrating the different classes of the Data Enhancement Engine and their associations.

FIG. 3 is an object class diagram, in Booch notation using the well-known Rational Rose development product by Rational Software Corporation of Santa Clara, Calif., showing the different classes of the Data Enhancement Engine and their associations. The classes shown are base classes, or abstract classes, from which other classes, specific to a client or enhancement process, may be derived through inheritance. That is, the Injector class 42 is a defined base class whose associations shown in FIG. 3 are common for all of its subclasses. Subclasses, which inherit from the Injector base class 42, are then further defined for use with specific client systems. This is also true for the Exciter 46 and Reactor 48 classes, except their subclasses are further defined for use with specific enhancement processes. This feature of the present invention allows a user to add new clients and enhancement processes quickly and easily by simply deriving the Injector, Exciter, and Reactor classes.

The Injector class 42 has a 1:n association with the Exciter class 46, the association being by reference. That is, an Injector object will have references to one or more Exciter objects. This is in accordance with the fact that a single client may require one or more enhancement processes for a record.

The Reactor class 48 has a 1:1 association with the Exciter class 46, the association being by value. That is, a Reactor object will own a distinct Exciter object. This is in accordance with the fact that an Exciter (i.e., 46a) is dedicated to a single, corresponding Reactor (i.e., 48a), together constituting an ENH Process 44a.

The WorkQueue class 50 is used by the Injector class 42 to perform input injections (unenhanced records) to the Reactor and Exciter classes. The Reactor class 48 accepts unenhanced records from and returns enhanced records to the WorkQueue class 50. Therefore, both the Injector 42 and Reactor 48 have a 1:1 association with the WorkQueue 50. This association is by reference only, since the WorkQueue may be used by many distinctly defined Injector, Reactor and Converter classes.

Both the WorkQueue class 50 and the Exciter class 46 are inherited from a Common Shared Memory (CmnShmem) class 62. CmnShmem 62 provides a generic set of utilities for creating and managing a shared memory queue. Both the Exciter 46 and WorkQueue 50 classes are based on a semaphore-controlled shared memory queue, and thus inherit the generic set of utilities provided by CmnShmem 62.

Both the Injector class 42 and the Converter class 56 have a 1:1 association with a Common Channel (CmnChannel) class 60. The CmnChannel class 60 sets up a common application program interface (API) for the Injector 42 to use to receive unenhanced records from the ENH In Channel 40. The CmnChannel 60 sets up another common API for the Converter 56 to use to send formatted, enhanced records to the Send process 26. These common channels allow the Injector and Converter applications to be developed independent of the communications methods used among the various client and server processes of the NIC. In fact, common channels may be used by any application in the NIC. Common channels are described in the identified co-pending application. The Injector's "has" association with CmnChannel is by value; that is, a distinct CmnChannel object is created and used exclusively by an Injector object. The same is true of the Converter's "has" association with CmnChannel.

A WorkCell class 64 is used to allocate a block of shared memory in the WorkQueue 50 to perform enhancement processes. A WorkCell object is created (as an instantiation of the class 64) by the WorkQueue, as indicated by the WorkQueue's "has" association with WorkCell 64.

The Reactor class 48 has a 1:1 association with the WorkCell class 64 by reference. This is in accordance with the fact that the Reactor 48 must use the WorkCell 64 to perform enhancement processes. The EnhanceDataObject class 66 refers to the data that are stored in the ENH Object Database 52. These data are entered by users and are used to enhance event records. Each instantiation of the EnhanceDataObject class 66 is an object that represents a specific datum that is to be added to an event record as part of a specific ENH Process 44. This is performed by a Reactor object. The number of EnhanceDataObject classes 66 that is associated to a Reactor class 48 depends on the configuration of the derived Reactor class. The base, abstract Reactor class 48 can accommodate multiple enhancement types, each with single or set of EnhanceDataObject classes 66.

Finally, the Converter class 56 has a 1:1 association with the WorkCell class 64 by reference. This is in accordance with the fact that the Converter 56 must reference a specific instantiation of the WorkCell class 64 to retrieve the enhanced record. The instantiation of the WorkCell class 64 is a WorkCell object in which the record enhancement is performed by the Reactor object. The Converter 56 then formats the record in accordance with a specific client's requirements, and passes the record to a send process 26.

Figure 4:
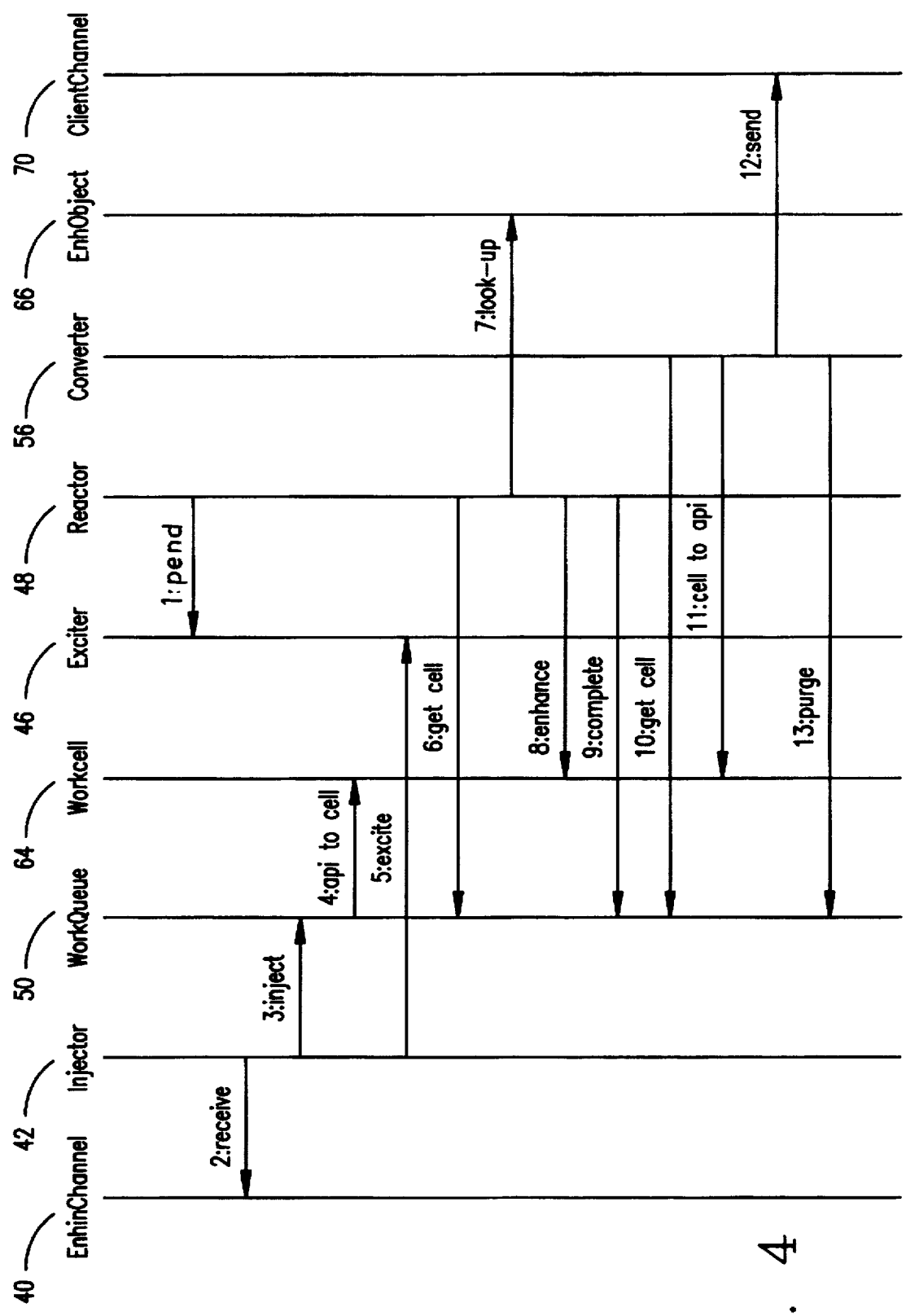
FIG. 4 is an object class interaction diagram illustrating an example of the sequenced interactions along the Data Enhancement Engine classes.

FIG. 4 is an object class interaction diagram illustrating an example of the sequenced interaction among the Data Enhancement Engine classes. The sequence of interactions are as follows:

1: Reactor 48 is in a constant state of pend (a state of being blocked from execution), while waiting to be triggered by the Exciter 46. The Exciter 46 triggers the Reactor 48 when data has been injected into the WorkQueue 50 by the Injector 42. When triggered, the Reactor 48 will retrieve this data from the WorkQueue 50. In this way, the Reactor 48 does not have to consistently poll the WorkQueue 50 for data, using unnecessary CPU time. It can remain in a state of pend until it is triggered by the Exciter 46.

2: Injector 42 receives a block of unenhanced records from the Distributor process 22 via the Data Enhancement Engine's input channel, EnhInChannel 40. If using Common Channels, as discussed in the previously referenced co-pending patent application, as in the preferred embodiment, these records will be encapsulated in an API message. Such a message is what the Common Channels class 60 uses for inter-process communications. By encapsulating a block of records in a single API message, rather than allocating one record per message, network transmission capacity is reduced since multiple records share message overhead.

3: Injector 42 places, or injects, the block of records in the WorkQueue 50. For each block received, a WorkCell 64 is created (a block of shared memory is allocated) and placed in the WorkQueue 50.

4: The block of records is allocated to the newly created WorkCell 64.

5: Injector 42 excites each Exciter 46/Reactor 48 pair that is needed for the required enhancements. This may be one or multiple Exciter 46/Reactor 48 pairs.

6: Reactor 48 retrieves the WorkCell 64 from the WorkQueue 50. The WorkCell 64 retrieved will be the one that was created when the Injector 42 input the records into the WorkQueue 50 in step 3.

7: Reactor 48 performs a look-up in the ENH Object Database 52 to retrieve the enhancement data object 66 needed for the enhancement process.

8: Reactor 48 performs the enhancement process by adding the data from the enhancement data object 66 to the record. This process is performed on each record within the WorkCell 64.

9: When the enhancement process is completed, the Reactor 48 leaves the WorkCell 64 in the WorkQueue 50 to signal completion.

10: Converter 56 retrieves the WorkCell 64 from the WorkQueue 50.

11: Converter 56 builds an API message with the enhanced record from the WorkCell 64. This message will be formatted for and addressed to the appropriate client system (28, 30, 32, 34).

12: Converter 56 sends the message to the client system using a ClientChannel 70 that has been built (instantiated) from the CommonChannel class 60.

13: Converter 56 purges the WorkCell 64 from shared memory in the WorkQueue 50.

Figure 5:
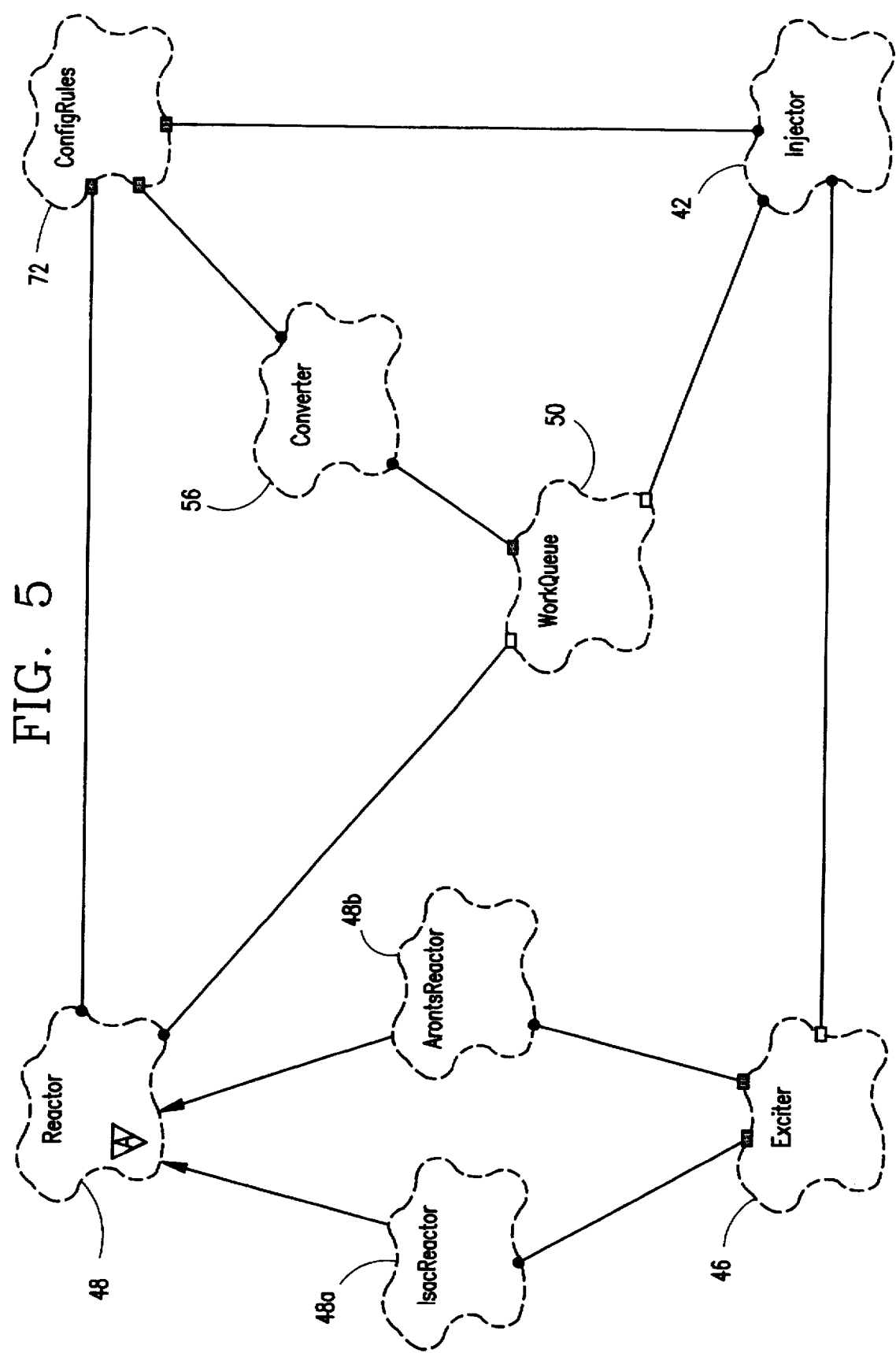
FIG. 5 is an object class diagram showing Exciter and Reactor base classes for specific enhancement types.

FIG. 5 is an object class diagram showing the Exciter 46 and Reactor 48 base classes, along with Reactor derived classes 48a, 48b for specific enhancement types. The Exciter 46 and Reactor 48 classes are used in pairs to form primary enhancement processing units such as 44a, 44b in FIG. 2. Each Exciter/Reactor pair is responsible for a single enhancement type. Multiple Exciter/Reactor pairs perform enhancements of more than one type in a parallel processing mode. The Exciter 46 receives an event from the Injector 42 which causes the Reactor 48 to be activated. The Reactor 48 contains methods in its class data structure that are specific to a particular enhancement type.

As shown, specific enhancement types can be easily implemented by deriving the appropriate Reactor class through inheritance. IsacReactor Reactor class 48a inherits attributes and methods from the Reactor base class 48, as does ArontsReactor class 48b. Each derived class 48a, 48b is then defined further to incorporate methods specific for their respective enhancement types. (Isac and Aronts refer to specific enhancement types).

A Configuration Rules (ConfigRules) class 72 contains all the rules for configuring, or defining, each derived Reactor 48, Converter 56, and Injector 42 class.

Figure 6:
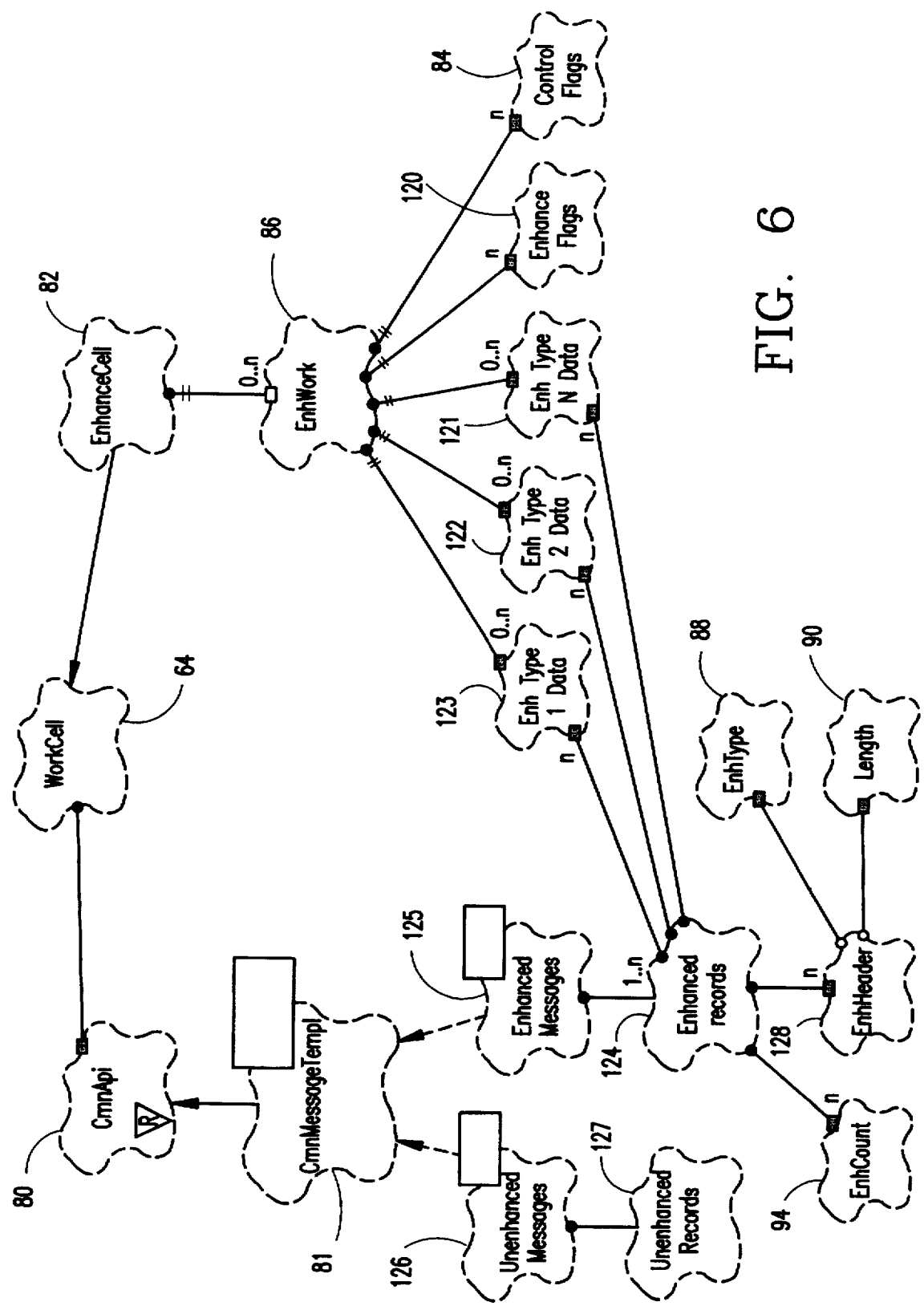
FIG. 6 illustrates the WorkCell class of the invention and its associations and derivations.

FIG. 6 shows the WorkCell class 64 and its associations and derivations. The WorkCell has reference to a specific Common API (CmnAPI) 80. The CmnAPI 80 is an API message received by the Distributor process 22, via the ENHInChannel 40, that contains unenhanced records. The WorkCell 64 is defined with the methods necessary to access the record contained within the CmnAPI 80.

As shown, the CmnAPI class 80 is an abstract class from which subclasses, such as CmnMessage 81, are derived.

The WorkCell 64 is actually a base class; a Reactor 48 will actually work on an EnhanceCell 82, which is a subclass derived from the WorkCell class 64 for a specific enhancement type. An EnhanceCell 82 contains a Control Flags 84 and an Enhance Flag 120. Control Flags 84 is a series of bits that is used to track the enhancement types that are to be performed. Each bit is set for a different enhancement type. When a Reactor 48 retrieves the EnhanceCell 82 from the WorkQueue 50 and completes its enhancement, the Reactor 48 clears its corresponding bit from the Control Flags 84 and sets a corresponding bit in the Enhance Flags 120 to indicate that the record has been enhanced. The Reactor 48 then places the EnhanceCell back in the WorkQueue 50. When all bits in the Control Flags 84 have been cleared, the Converter 56 is activated to retrieve the EnhanceCell for processing.

An EnhanceCell 82 also contains one or more EnhWork 86 objects. A EnhWork 86 cooperates with the structure in the EnhanceCell 82 for receiving the enhancement data and associating it with the record in the API 80. It contains a Type class 88, indicating the type (char, short, long, etc) of enhancement data, and a Length class 90, indicating the length of the enhancement data.

As shown, a EnhWork 86 is an abstract class from which subclasses are derived. Subclasses, such as EnhType 1 through N Data (121, 122, 123), may be derived in a hierarchical manner, as is standard in object-oriented design. Subclasses EnhType 1–N (121, 122, 123) represent the actual objects for specific enhancement types.

During the enhancement phase of processing performed by a Reactor class 48, enhancement data is placed into an EnhWork class 86 based on the Control Flags. There is a one-bit Control Flag 84 for each call data record (CDR) requiring an enhancement of the type being performed by a particular Reactor class 48. During the conversion phase, when the call records and associated enhancements are formattted for clients, the CDRs and enhanced data are interleaved such that the CDRs and their associated enhancements are placed in contiguous locations inthe formatted CmnApi object 80. This is done by the Converter class 56. The Converter class 56 determines which CDRs have enhancements based on the Enhance Flags 120. There is one bit in the Enhance Flag 120 for each CDR. The Reactor class 48 sets the associated Enhance Flag 120 bit for each CDR that is enhanced.

Each enhancement is preceded by an EnhHeader class 128. The EnhHeader class 128 contains a "short integer type" field and a "short integer length" field. These fields ("type" and "length") are used by clients to extract the enhancement information from the CmnApi object 80. Each CDR is followed by a short integer EnhCount 94. EnhCount 94 specifies the number of enhancements associated with the preceding CDR. The EnhCount 94 is followed by the number of enhancements it specifies.

A EnhCount class 94 tracks the number of records for a specific enhancement type. This can be up to the maximum number of records in a record block, contained in a single API message.

Figure 7:
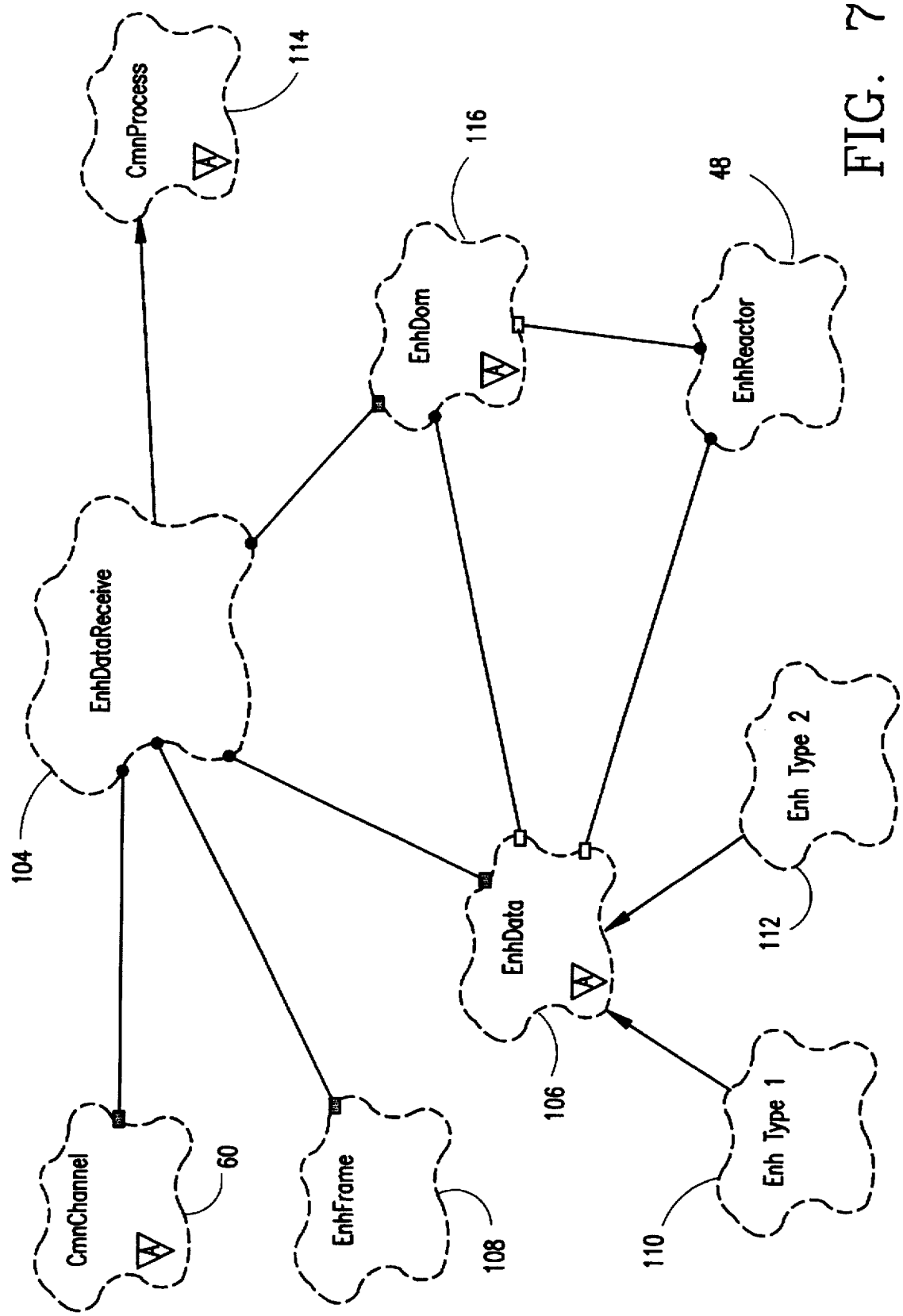
FIG. 7 is an object class diagram, in Booch notation illustrating the classes that process data.

FIG. 7 is a Booch class diagram of the enhance data classes. These are the classes that process data received by the Enhance Data Entry Channel 54, and store data in the Enhance Object Database 52. An EnhanceDataReceive class 104 receives enhance data via an object created from the CommonChannel class 60. It then creates an object for each data message using an EnhData class 106, and stores this object in the Object Database 52. EnhDataReceive 104 also uses an Enhance Frame class 108 for methods used to extract data from a frame and to send acknowledgment back to the system from which enhance data was received. This system accepts user input data, processes it, and sends it to the Data Enhancement Engine 24; it may be any of various applications not part of the present invention per se.

To use Common Channels as disclosed in the previously identified co-pending patent application, the EnhDataReceive class 104 is abstracted to a Common Process (CmnProcess) class 114. The CmnProcess class 114 will contain the methods, specific to the EnhDataReceive application, to create the objects needed to use the CmnChannel 60.

The EnhData class 106 is an abstract class from which subclasses for specific enhancement data types 110, 112 may be derived. Enhancement data types 110, 112 define data to be used for enhancements for specific client systems.

An Enhance Database Object Manager (EnhDom) class 116 performs database operations on the enhance data objects contained in the ENH Object Database 52. These operations include add, delete, and modify data. EnhDom 116 also performs database 52 lookups for the EnhReactor 48.

Figure 8:
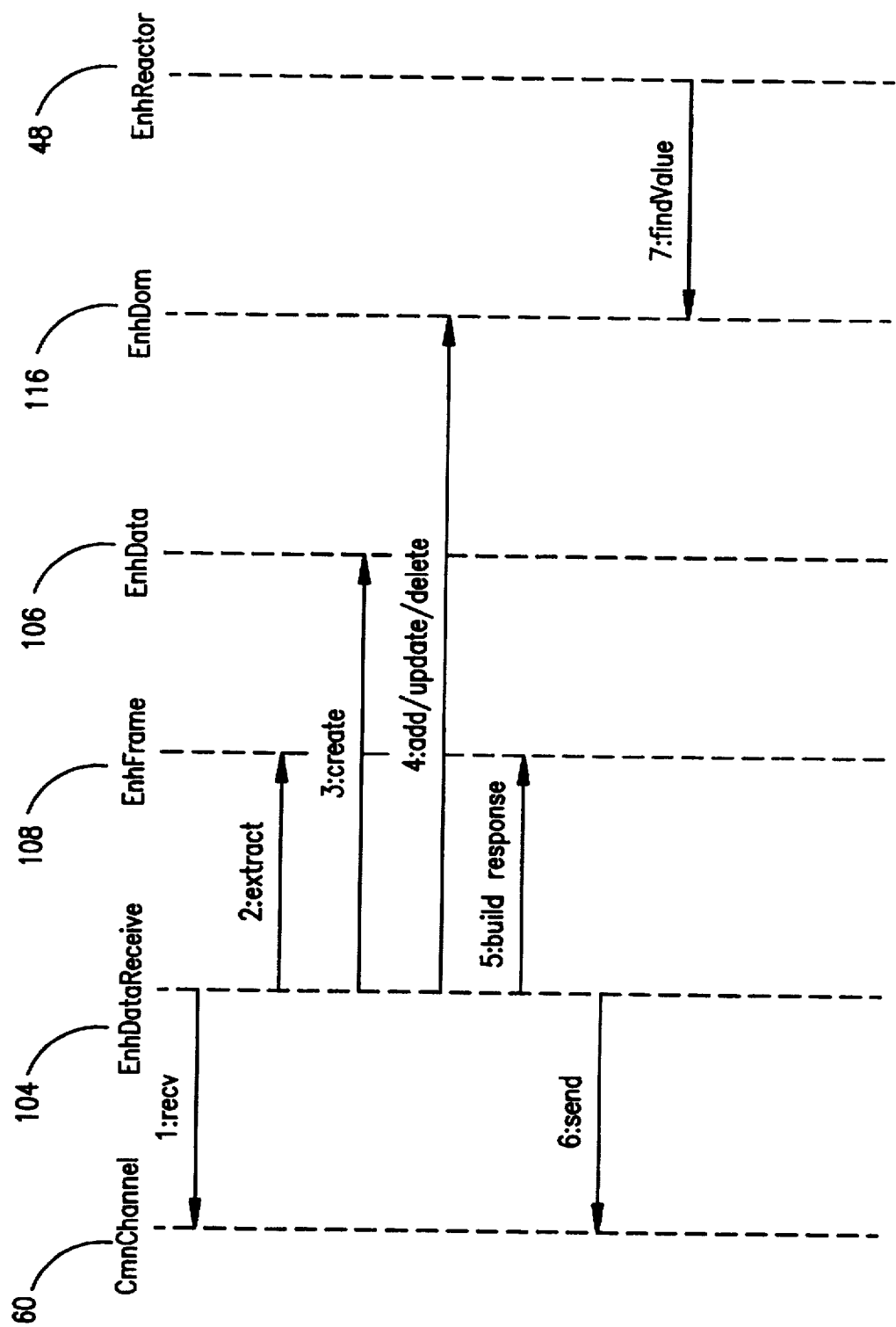
FIG. 8 is an object class interaction diagram relative to the Enhance Data classes.

FIG. 8 is an object class interaction diagram illustrating an example of the sequenced interaction among the Enhance Data classes. The sequence of interactions are as follows:

1: EnhDataReceive 104 receives data from an enhance data entry system via a CommonChannel 60.

2: An instance of an EnhFrame 108 is created for acknowledgement. EnhDataReceive 104 extracts a message from EnhFrame 108.

3: EnhDataReceive 104 creates an EnhData object 106 and stores it in the Object Database 52.

4: EnhDataReceive 104 instructs EnhDom 116 to perform the appropriate database operation (add, delete, modify).

5: When all messages have been extracted (steps 2–4 are iterative), EnhDataReceive 104 responds to the enhance date entry system by building a response frame within the EnhFrame object 108.

6: EnhDataReceive 104 sends the response frame via the CommonChannel 60.

As will be appreciated from the foregoing description, the Data Enhancement Engine of the present invention is distinguishable over the prior art in its use of derivable object classes to create new enhancement processes. Derivable object classes is standard technology, but their use in the present invention provides a scalable architecture that allows the addition of discrete enhancement processes 44. Adding enhancement processes thus becomes a quick and simple operation.

The Data Enhancement Engine also allows multiple enhancement processes 44 to work on a single record in parallel, thus expediting the overall enhancement process.

The use of WorkCells within a WorkQueue to perform multiple enhancement processes on multiple records also provides a unique approach as does the use of Exciters and Reactors, in such as way that Reactors need not continuously poll (and therefore use CPU time) the WorkQueue for data.

When new client systems are added or existing client systems are modified, their requirements for data enhancements on an event record collection platform, such as the above identified NIC will be augmented. The Data Enhancement Engine allows for fast, simple modifications to be made to meet these new requirements. New enhancement processes may be added by deriving new Reactor classes, then defining their methods specific to the enhancement process they are supporting. The architecture makes the Data Enhancement Engine resilient to future change and growth of the NIC platform.

It should be understood that the invention is not limited to the exact details of construction shown and described herein for obvious modifications will occur to persons skilled in the art.

We claim:

1. A data enhancement engine driven by a method for enhancing unenhanced records to a plurality of enhancements types, the method comprising the steps:

subjecting unenhanced records to filtering for providing a separate record for each type of enhancement and to eliminate records that do not require enhancement;

subjecting a record to an injector (Injector) process object class for determining the type of enhancement needed for the record, the Injector classes for each client inheriting their attributes and methods from a base Injector class;

subjecting the unenhanced records to a plurality of respective parallel running enhancement processes (ENH Process), each of which includes an Exciter object and a Reactor object, the latter two objects being instances of defined Exciter and Reactor classes, the Exciter and Reactor classes for each enhancement type inheriting their attributes and routines from the same Exciter and Reactor base classes, respectively, these base classes then specifically being defined for a distinct enhancement type;

the Injector determining which ENH Processes are needed for a received unenhanced record;

the Injector placing the unenhanced record in a WorkQueue class and triggering an associated Exciter, the WorkQueue allocating a region of memory (WorkCell class), and places the record in the memory;

the Exciter indicating the WorkCell that contains the record in response to the Injector triggering the Exciter;

the Exciter activating the Reactor and providing the name of the WorkCell;

the Reactor accessing the WorkCell within the WorkQueue for instructions on performing the data enhancement;

the Reactor performing a query to an ENH Object Database to retrieve enhancement data, the ENH Object Database containing all the data that is needed for enhancing each type of event record in accordance with a client systems'requirements, an ENH Data Entry Channel populating the Database with input from users;

the Reactor when triggered by the Exciter, retrieving both the unenhanced record from the WorkQueue and the appropriate enhancement data from the ENH Object Database;

the Reactor performing data enhancements and placing the enhanced record back in the WorkQueue;

a Converter process, implemented as a class, retrieving the enhanced records from the WorkQueue and formatting them for the client systems that are to receive the enhanced records;

the Converter passing the formatted enhanced record to one or more Send processes, implemented as classes, which send them to the appropriate client systems.

2. The method of claim 1 further wherein a plurality of ENH Processes act on a single record in parallel, each enhancement type, which has a distinct ENH Process working on a distinct segment of the record.

3. A sequenced interaction among classes of a Data Enhancement Engine for enhancing unenhanced records to a plurality of enhancements types, the interaction comprising a method having the steps:

maintaining a Reactor class in a constant state of pend (being blocked from execution), in preparation of being triggered by an Exciter class;

the Exciter triggering the Reactor when data has been injected into a WorkQueue class by an Injector class;

the Reactor, when triggered, retrieving the data from the WorkQueue, whereby the Reactor need not have to consistently poll the WorkQueue for data;

the Injector class receiving a block of unenhanced records from a Distributor process via an input channel class (EnhInChannel);

the Injector injecting a block of records in the WorkQueue;

creating a WorkCell for each block received and injected in the WorkQueue allocating the blocks of records to the created WorkCell;

each pair of Exciter and Reactor being excited by an Injector corresponding to a corresponding enhancement;

the WorkCell being retrieved from the WorkQueue by the Reactor, the WorkCell retrieved being the one that was created when the Injector input the block of records into the WorkQueue;

the Reactor performing a look-up in the ENH Object Database to retrieve the enhancement data object needed for enhancement;

the Reactor performing enhancement by adding the data from the enhancement data object to a record, the enhancement being performed on each record within the WorkCell;

upon completion of enhancement, the Reactor leaving the WorkCell in the WorkQueue to signal completion;

a Converter class retrieving the WorkCell from the WorkQueue;

the Converter building an application program interface (API) message with an enhanced record from the WorkCell, this message formatted for and addressed to an appropriate client system;

the Converter sending the message to the client system using a ClientChannel class that has been generated (instantiated) from the CommonChannel class; and the Converter purging the WorkCell from shared memory in the WorkQueue.

4. The method set forth in claim 3 further comprising:

encapsulating records in an API message; and supplying the API message to a Common Channels class for executing interprocess communications thereby reducing network transmission capacity requirements since multiple records share message overhead.

5. The interaction set forth in claim 3 wherein the method further comprises the steps:

(a) creating an EnhDataReceive class for receiving data to be enhanced from an entry system via a CommonChannel;

(b) creating an instance of an EnhFrame class for signaling acknowledgement of received data;

(c) EnhDataReceive extracting a message from EnhFrame;

EnhDataReceive creating an EnhData object and storing it in an Object Database;

(d) EnhDataReceive instructing an EnhDom class to perform a preselected database operation;

(e) iterating steps (b)–(d) until all messages have been extracted;

(f) EnhDataReceive responding to the date entry system by building a response frame within the EnhFrame object; and (g) EnhDataReceive sending the response frame via the CommonChannel.

* * * * *